US010697767B2

(12) United States Patent
Hashizume et al.

(10) Patent No.: US 10,697,767 B2
(45) Date of Patent: Jun. 30, 2020

(54) SAMPLE FOR MEASURING PARTICLES, METHOD FOR MEASURING PARTICLES AND APPARATUS FOR MEASURING PARTICLES

(71) Applicant: HITACHI HIGH-TECHNOLOGIES CORPORATION, Tokyo (JP)

(72) Inventors: Tomihiro Hashizume, Tokyo (JP); Masatoshi Yasutake, Tokyo (JP); Sanato Nagata, Tokyo (JP)

(73) Assignee: HITACHI HIGH-TECHNOLOGIES CORPORATION, Tokyo (JP)

(*) Notice: Subject to any disclaimer, the term of this patent is extended or adjusted under 35 U.S.C. 154(b) by 0 days.

(21) Appl. No.: 16/325,590

(22) PCT Filed: Aug. 31, 2016

(86) PCT No.: PCT/JP2016/075443
§ 371 (c)(1),
(2) Date: Feb. 14, 2019

(87) PCT Pub. No.: WO2018/042535
PCT Pub. Date: Mar. 8, 2018

(65) Prior Publication Data
US 2019/0178640 A1 Jun. 13, 2019

(51) Int. Cl.
G01B 15/08 (2006.01)
G01N 23/225 (2018.01)
G01N 15/02 (2006.01)
G01N 15/06 (2006.01)
G01B 15/00 (2006.01)
G01Q 30/06 (2010.01)

(52) U.S. Cl.
CPC ............. *G01B 15/08* (2013.01); *G01B 15/00* (2013.01); *G01N 15/02* (2013.01); *G01N 15/06* (2013.01); *G01N 23/225* (2013.01); *G01Q 30/06* (2013.01)

(58) Field of Classification Search
CPC ........ G01B 15/00; G01B 15/08; G01N 15/00; G01N 15/02; G01N 15/06; G01N 23/225; G01Q 30/06
See application file for complete search history.

(56) References Cited

U.S. PATENT DOCUMENTS

2006/0113469 A1 1/2006 Theriot, Sr.
2010/0015718 A1* 1/2010 Ah ..................... G01N 33/5308
436/94

FOREIGN PATENT DOCUMENTS

JP 8-304426 A 11/1996
JP 2002-181725 A 6/2002
JP 2004-264039 A 9/2004
(Continued)

OTHER PUBLICATIONS

International Search Report for PCT/JP2016/075443, dated Nov. 22, 2016.

Primary Examiner — David E Smith
(74) Attorney, Agent, or Firm — Volpe and Koenig, P.C.

(57) ABSTRACT

To provide a sample for measuring particles enabling the three-dimensional particulate shape to be measured and the particulate species to be evaluated, the sample for measuring particles includes a substrate; isolated nanoparticles to be measured which are disposed on the substrate; and isolated standard nanoparticles which are disposed on the substrate in the vicinity of the isolated nanoparticles to be measured.

6 Claims, 10 Drawing Sheets

(56) References Cited

FOREIGN PATENT DOCUMENTS

| | | | |
|---|---|---|---|
| JP | 2007-163354 A | | 6/2007 |
| JP | 2010-155218 A | | 7/2010 |
| JP | 2010-197175 A | | 9/2010 |
| JP | 2010197175 A | * | 9/2010 |
| JP | 2011-220723 A | | 11/2011 |
| JP | 2011220723 A | * | 11/2011 |

* cited by examiner

SAMPLE FOR MEASURING PARTICLES, METHOD FOR MEASURING PARTICLES AND APPARATUS FOR MEASURING PARTICLES

TECHNICAL FIELD

The present invention relates to a sample for measuring particles, a method for measuring particles and an apparatus for measuring particles.

BACKGROUND ART

In recent years, it is apprehended that minute particles (nanoparticles) having 10 nm to several 100 nm in diameter which are being used in such various industries as cosmetics might cause damage on human health with the infiltration into human bodies or their cells, as the result of which the USA and European countries have started regulating the use of such particles for commercial use. The use of such particles is regulated based on their diameter in France and other countries while it is regulated based on their toxicity in the USA in addition to their diameter. Accordingly, it is necessary to measure the three-dimensional particulate shape and evaluate the particulate species (particle materials).

As to measuring the three-dimensional particulate shape of such particles, it is to be standardized by means of such microscopes employing a charged particle beam (hereinafter, referred to as charged particle microscopes) as scanning probe microscopes (SPM) and scanning electron microscopes (SEM). According to the conventional steps of measuring such particles, to begin with, the sample powders extracted from the powdered raw nanoparticle material is scaled; and then such sample powders are dispersed in a solution from which impurities are removed so as to be changed into a suspended solution. In this regard, the particulate species included in nanoparticles, the average particle size, the standard deviation of particle sizes and the particle size distribution for each particulate species are all unknown, and there are many particles whose three-dimensional shape is varied or other than complete sphere. As one example, the measuring steps according to an atomic force microscope (AFM) which is one of the SPMs are as follows, which steps are also applied to the charged particle microscopes.
(1) Step of preparing a suspended solution of nanoparticles to be measured
(2) Step of dropping such suspended solution onto a flat substrate
(3) Step of drying a droplet
(4) Step of subjecting a probe profile to AFM measurement employing a standard sample
(5) Step of selecting a location of the dried droplet which is optimal with respect to the density of nanoparticles through AFM measurement
(6) Step of measuring three-dimensional shape images of nanoparticles whose number is sufficient for carrying out statistical processing
(7) Step of smoothing three-dimensional shape images to remove noises from the shape images
(8) Step of particulate analysis: calculating an average particle size of nanoparticles to be measured, the standard deviation of particle sizes and the particle size distribution The spatial resolution in the order of 1 nm with respect to the asperity measurement (height measurement) is feasible with SPMs. However, with the three-dimensional measurement through SPMs, the particulate size with respect to the transversal direction (i.e. direction in parallel with the substrate surface on which nanoparticles are fixed) is measured with enlargement according to the shape of the tip end portion of the probe, which is generally called as probe shape effect. Accordingly, it requires that the measured information be corrected by some measures. With the charged particle microscopes, such method of obtaining information on the three-dimensional particulate shape is employed as e.g. tilting the substrate on which nanoparticles are fixed with respect to the direction in which the charged particle beam is made incident. However, such SPMs and charged particle microscopes have it in common that the resulting images do not always correctly represent the shape of a sample due to e.g. the intensity profile of the charged particle beam and the secondary charged particle generation mechanism.

In Patent Literature 1, there is disclosure on a measured shape correction means to detect the state of the probe based on the measured result of a standard sample whose shape is known and to rectify the measured result of a sample surface based on the detected state of the probe, in addition to which information on the three-dimensional shape of a sample are obtained by alternately measuring a standard sample and a sample to be measured so as to rectify such probe shape effect.

In Patent Literature 2, there is disclosure on a method for measuring the surface roughness of nanoparticles including the steps of dropping a solution in which silica nanoparticles are dispersed onto the mica substrate having the amino group on the surface; drying the droplet to fix the same on the substrate; measuring the three-dimensional shape image of the silica nanoparticles by means of an atomic force microscope (AFM); and calculating the arithmetic mean roughness, thereby, allowing the surface shapes of the nanoparticles to be distinguished from one another with numeric values.

CITATION LIST

Patent Literature

Patent Literature 1: Japanese Unexamined Patent Application Publication No. 2004-264039
Patent Literature 2: Japanese Unexamined Patent Application Publication No. 2011-220723

SUMMARY OF INVENTION

Technical Problem

The concerned including the present inventors, employing the method disclosed in Patent Literature 1, have obtained the three-dimensional shape of a sample by alternately measuring standard nanoparticles and nanoparticles to be measured which are placed on separate substrates, thereby, rectifying the probe shape effect. However, it is found that there are some cases where data with reproducibility are not obtained even with the same sample used for the measurement.

Further, with the fixing method (spreading method) of the nanoparticles according to Patent Literature 2, on account that the nanoparticles are aggregated so as to form two-dimensional insular structures, information on the side walls of the individual nanoparticles are not included in AFM images, which makes it impossible to obtain information on their three-dimensional shape.

Further, generally speaking, information on the nanoparticle species (nanoparticle materials) are not included in information on the three-dimensional shape of a sample obtained through the SPM measurement.

The present invention is to provide a sample for measuring particles, a method for measuring particles and an apparatus for measuring particles which allow the three-dimensional particulate shape to be measured and the particulate species to be evaluated.

Solution to Problem

The sample for measuring particles according to one embodiment of the present invention to achieve the above purpose is characterized in including a substrate: isolated nanoparticles to be measured which are disposed on the substrate; and isolated standard nanoparticles which are disposed on the substrate in the vicinity of the isolated nanoparticles to be measured.

Further, the method for measuring particles according to another embodiment of the present invention for that purpose is characterized in including a first step of preparing a substrate on which isolated nanoparticles to be measured are disposed and isolated standard nanoparticles are disposed in the vicinity of the isolated nanoparticles to be measured; a second step of measuring the isolated nanoparticles to be measured and the isolated standard nanoparticles which are disposed on the substrate employing a scanning probe or a charged particle beam probe; a third step of deriving a shape of the scanning probe or a beam profile of the charged particle beam probe from results of the isolated standard nanoparticles measured at the second step; and a fourth step of rectifying a three-dimensional shape of the isolated nanoparticles to be measured employing the shape of the scanning probe or the beam profile of the charged particle beam probe.

Further, the apparatus for measuring particles according to another embodiment of the present invention for that purpose is characterized in including a scanning probe or a charged particle beam probe; and a substrate on which isolated nanoparticles to be measured are disposed and isolated standard nanoparticles are disposed in the vicinity of the isolated nanoparticles to be measured.

Advantageous Effects of Invention

According to the present invention, it allows a sample for measuring particles, a method for measuring particles and an apparatus for measuring particles which enable the three-dimensional particulate shape to be measured and the particulate species to be evaluated to be provided.

DESCRIPTION OF EMBODIMENTS

Figure 1:
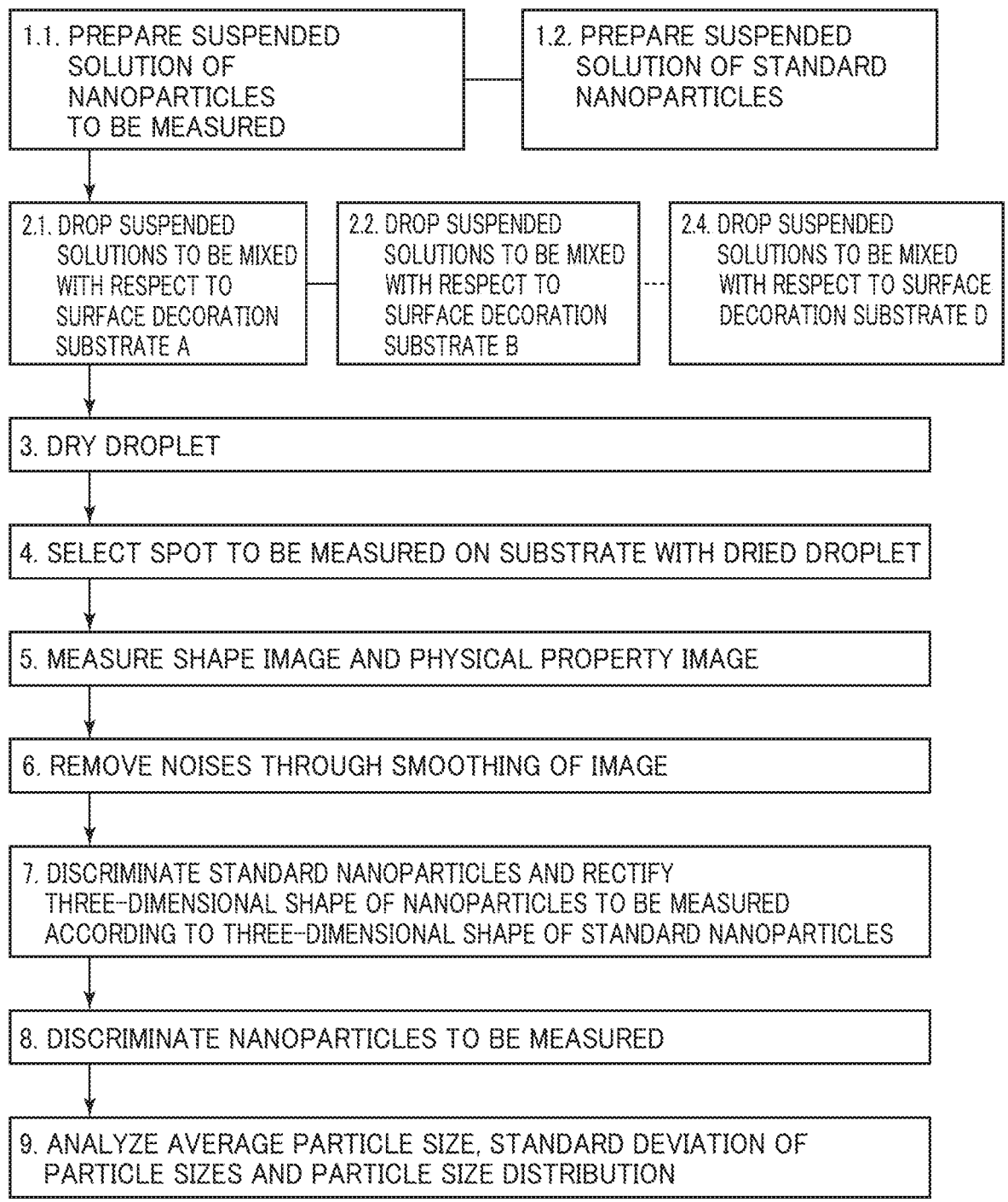
FIG. 1 is a flow chart illustrating the measuring steps of the nanoparticles employing a suspended solution in which nanoparticles to be measured and standard nanoparticles are contained according to the method for measuring particles of a first embodiment.

The concerned including the inventors have discussed the reasons why data with reproducibility cannot be obtained even with the measurement of the three-dimensional particulate shape made employing the same nanoparticles to be measured and the same standard nanoparticles. According to the measuring conditions, there are some cases where the tip end of the probe for measurement might change in shape due to abrasion caused by the interaction with a sample during measurement. Thus, the method for suppressing or minimizing the abrasion of the probe has been further tabled for discussion, as the result of which they have thought up an idea that the standard nanoparticles are preferably to be disposed in the vicinity of the nanoparticles to be measured. Just measuring the standard nanoparticles in the vicinity of the nanoparticles to be measured and rectifying the shape of the probe permits the abrasion of the probe during measurement to be minimized or suppressed. More specifically, the three-dimensional shape of the nanoparticles to be measured is obtained by preparing such a sample as the nanoparticles to be measured and the standard nanoparticles coexisting within one image (measuring screen in the order of 50 μm in square or smaller, preferably several μm in square) on the same substrate. As a result, the abrasion of the probe during measurement is suppressed, which leads to favorable measurement result. To note, by using the standard nanoparticles adjoining to the nanoparticles to be measured, it permits better measurement result to be obtained.

Methodically speaking, the preparation of a sample in which the standard nanoparticles are disposed in the vicinity of the nanoparticles to be measured is as follows. That is to say, a suspended solution in which the nanoparticles to measured and the standard nanoparticles are contained is dropped on the substrate decorated with a functional group with a chemical or physical interaction and the droplet is dried, thereby, the nanoparticles being spread over the substrate with those to be measured as well as the standard ones coexisting and isolated from one another in terms of particulate disposition (spreading isolated particles). This made the nanoparticles less aggregated with one another than in the case where the suspended solution in which the nanoparticles to be measured and the standard ones are contained is dropped on a non-decorated substrate and the droplet is dried, which results in successfully preparing a sample optimal for measurement. To note, a suspended solution in which the nanoparticles to be measured are contained may be mixed with that in which the standard ones are contained on the substrate.

The above nanoparticles spread sample is measured by a scanning probe microscope (SPM) or a charged particle beam microscope so as to obtain the three-dimensional length of the standard nanoparticles, based on the result of which the shape of the SPM probe and the charged particle beam profile are rectified so as to obtain information on the three-dimensional length of those to be measured. In this way, bad influences entailing the change of the SPM probe in shape and the change of the charged particle beam profile are suppressed, as a result of which reproducible and correct information on the three-dimensional length of those to be measured can be obtained. Further, by those to be measured and the standard ones coexisting within one image (screen to be measured), it permits more correct rectification information to be obtained on the spot, so that the rectifications of shape are made in a more secure manner compared with the measurement method by which such rectification is made by alternately measuring a standard sample and a sample to be measured which are disposed on different substrates, which results in shortening the time required for measurement.

Further, based on particulate shapes and physical property images measured simultaneously with such shapes, it allows the average particle size, the standard deviation of the particle sizes and the particle size distribution for each species of the nanoparticles to be measured to be measured with the particulate species discriminated from one another. Such information for each particle as an aspect ratio (ratio of a length of the major axis of a particulate cross-sectional image to a length of the minor axis thereof), surface roughness as well as phase difference in a phase image, viscosity, electric conductivity and magnetic force according to the SPM measurement can be put to use upon the particles being discriminated from one another.

Hereafter, the present invention is described in detail with reference to the following embodiments. It should be noted that the same reference signs in the accompanying drawings denote the same components.

First Embodiment

In the embodiment, the measurement by the scanning probe microscope (SPM) is exemplified and the measuring steps are explained as follows, which steps are also applicable to the measurement by a charged particle beam microscope. FIG. 1 is a flow chart illustrating the measuring steps of the nanoparticles employing a suspended solution in which the nanoparticles to be measured and the standard particles are contained according to the method for measuring particles of the embodiment. The measuring steps of such nanoparticles according to the embodiment are explained with reference to FIG. 1.

1. Preparation of Suspended Solution

In the same way as the conventional steps of measuring the nanoparticles, to begin with, the sample powders extracted from the powdered raw nanoparticle material is scaled; and then such sample powders are dispersed in a solution from which impurities are removed so as to be changed into a suspended solution. The solution used for preparing the suspended solution is generally an aqueous solution. The solution is composed of a solvent (generally, pure water) and a dispersing agent to suspend nanoparticles, in which the dispersing agent includes e.g. surfactants and buffer agents to adjust the acidity/alkalinity of the solution. In the embodiment, it includes the preparation of a suspended solution for the nanoparticles to be measured (Step 1.1 of FIG. 1) and the preparation of a suspended solution for the standard nanoparticles (Step 1.2 of FIG. 1).

According to the embodiment, the suspended solution for the nanoparticles to be measured and that for the standard ones are separately prepared, but according to the combination between those to be measured and the standard ones, the suspended solution may be prepared by mixing the powders of those to be measured and those of the standard ones at the stage of their powdery stages so as to be dispersed in one liquid. In the case where the surface properties (e.g. hydrophile, hydrophobe, organophile) of those to be measured and the standard ones and the characteristics (e.g. acidity/alkalinity, a dispersing agent) of the solutions used for the suspended solutions are similar to one another, there are some cases where it is optimal to prepare a suspended solution containing both those to be measured and the standard ones.

Such nanoparticles are optimal for the standard ones as being approximately close to sphere in shape (nanoparticles with complete sphere) and being smaller in the deviation of particle sizes. In order to prevent such phenomenon as nanoparticles being overlapped with one another and escaped from microscopic observation form occurring, the particle size of the standard ones is optimally in the order of 0.7 to 1.3 times as large as that of those to be measured. However, this optimal condition is not absolutely essential under the condition that the nanoparticles can be spread over the substrate with isolated from one another in terms of particulate disposition (as isolated particles).

The table 1 exemplifies the surface conditions of the nanoparticles contained in a suspended solution which are distributed on the market and the representative dispersing agents contained therein. The minute particles (nanoparticles) having a particle size in the order of 10 to 100 nm can be classified into such high molecular weight nanoparticles as PSL (polystyrene latex), such metallic nanoparticles and alloy nanoparticles as silver and gold, and such inorganic nanoparticles (ceramic nanoparticles) as containing silica, alumina, calcium carbonate, hydroxyapatite $[Ca_5(OH)(PO_4)_3]_x$, nitrides, carbides, carbon nanoparticles and diamond nanoparticles among others.

TABLE 1

| Nanoparticle | Surface Condition | Dispersing Agent etc. |
| --- | --- | --- |
| PSL (polystyrene latex) | Phenyl Group Based High Molecular Weight Polymer | Partly —COOH group |
| Silver | Silver Atoms + Electrical Double Layer | Stabilized with Weak Acidity |
| Gold | Gold Atoms + Electrical Double Layer | Buffer Liquid made from sodium citrate |
| Silica | Ending with —Si—OH Group | No Dispersing Agent |
| Alumina | Ending with —Al—OH Group | No Dispersing Agent |
| Calcium Carbonate | Ending with —C—OH Group | Surfactant |
| Hydroxyapatite $[Ca_5(OH)(PO_4)_3]_x$ | Ending with —Ca—OH Group Ending with —P—OH Group | No Dispersing Agent |

Generally speaking, the high molecular weight nanoparticles are hydrophobic presenting organophile, but some of them are chemically bonded with a —COOH group on the surface so as to result in being rather hydrophilic as in the case of PSL. With the metallic nanoparticles as well as the alloy nanoparticles, they form an electrical double layer on the surface through a weak acidic solution or a weak alkaline solution so as to secure stability in the solution. With the inorganic nanoparticles, some of them are considered suspended in the solution with oxygen atoms of oxides on their surface chemically changed into —OH groups whereas the rest of them are insufficient in hydrophile as they are, so that they are suspended in the solution through such dispersing agents as surfactant.

To enable the nanoparticles to be spread over the substrate with isolated from one another in terms of particulate disposition (as isolated particles), it is preferred that the surface condition of the standard nanoparticles within the suspended solution be similar to the surface condition of the nanoparticles to be measured within the same. For this reason, if possible, it is preferred that the standard ones and those to be measured be in the same class selected from the high molecular weight nanoparticles, the metallic/alloy nanoparticles and the inorganic nanoparticles, but such selection is not absolutely essential according to the combination of the standard ones and those to be measured as well as the combination of the substrates over which the nanoparticles are spread.

On account that the PSL nanoparticles having a particle size in the order of 30 to 200 nm are approximately close to complete sphere in shape and are smaller in the deviation of particle sizes, they are optimal for the standard ones. Further, the silver nanoparticles having a particle size in the order of 30 to 80 nm, the gold nanoparticles having a particle size in the order of 15 to 100 nm as well as the silica nanoparticles having a particle size in the order of 50 to 150 nm may be also adopted for the standard ones. As with the silica nanoparticles, the colloidal silica ones are optimal for the standard ones due to the ease with which they are dispersed in the aqueous solution.

2. Dropping and Mixing with Respect to Surface Decorated Substrate

The suspended solution of the nanoparticles to be measured and that of the standard ones are spread over the substrate whose surface is decorated and over which such nanoparticles are spread. The precision (measuring error) with which the height of the nanoparticles is measured with the scanning probe microscope (SPM) taken into considerations, an appropriate area (8 to 20 mm in square) of a semiconductor silicon wafer, which is comparatively easily available on the market and is excellent in uniformity and flatness as well as in which a wafer to wafer difference hardly occurs during the production, is adopted for the substrate. In this regard, it is preferred that the nanoparticles be spread over the substrate with isolated from one another in terms of particulate disposition (as isolated particles).

For that purpose, the surface of the silicon substrate is treated with a silane coupling agent so as to turn such substrate into a surface decorated substrate which controls the interaction with the nanoparticles. The table 2 illustrates silane coupling agents used for preparing the surface decorated substrate, the surface decorated groups and the expected interactions. The silicon substrate is normally covered with a natural oxide film and is expected ending with a —Si—O—Si— group and a —Si—OH group so that it is ideally hydrophilic, but it generally presents water repellent property with e.g. the attachment of organic molecules thereon. For this reason, to begin with, the silicon substrate is dipped into an aqueous solution with the admixture of hydrogen chloride, hydrogen peroxide and water (mixing ratio $HCL:H_2O_2:H_2O=3:1:1$) for 10 to 15 minutes so as to be subjected to impurities removal and hydrophilic treatment. There are cases where the hydrophilic silicon substrates which are washed with pure water are adopted for the substrates over which the nanoparticles are spread as they are (in such cases, represented as Si—OH group).

TABLE 2

| Silane Coupling Agent | Molecular Structure | Terminal Group | Expected Interaction |
|---|---|---|---|
| HMDS Hexamethyldisilazane | 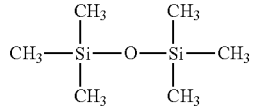 | Methyl Group —$CH_3$ | Organophilic Property |
| VIMS Vinyltrimethoxysilane | 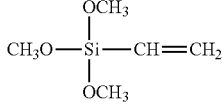 | Vinyl Group —$CH=CH_2$ | Organophilic Property |
| APTMS Aminopropyltrimethoxysilane | 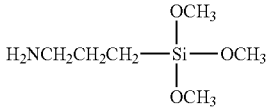 | Amino Group —$NH_2$ | Reaction with Carbonate Hydrogen Bond |
| TMPT Trimethoxysilylpropanethiol also known as MPTMS Mercaptopropyltrimethoxysilane | 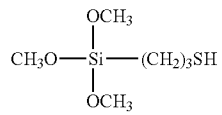 | Thiol Group —SH | Metal (such as gold, silver and platinum)-Thiol Bond |
| None (hydrophilic treatment) | — | Hydroxy Group —OH | Hydrogen Bond |

For the chemical treatment of the hydrophilic silicon substrate, the silane coupling agents illustrated in Table 2 are used. 10 to 20µ liter of a silane coupling agent is dropped with respect to a silicon wafer (8 to 20 mm in square) and spread over the surface of the wafer through spin coating; and keeping the wafer on the hot plate under the temperature of 90 degrees Centigrade for 10 minutes so as to be subjected to heating and drying treatment. The VTMS (Vinyltrimethoxysilane) is applied with its concentration diluted by one-fifth with toluene. The silane coupling agent is turned into silanol by hydrolysis and partly condensed into an oligomeric state. Thereafter, the oligomeric state turned to coupling agent is absorbed through hydrogen bonding to hydroxyl groups on the surface of the silicon substrate; and subjecting the substrate to heating and drying treatment induces dehydration condensation reaction so as to produce a firm chemical bonding state.

In this relation, the substrate surface is chemically decorated with the terminal groups according to the types of the silane coupling agents in use. When HMDS (Hexamethyldisilazane) (surface decoration A), VTMS (Vinyltrimethoxysilane) (surface decoration B), APTMS (Aminopropyltrimethoxysilane) (surface decoration C), TMPT (Trimethoxysilylpropanethiol, alias, MPTMS (Mercaptopropyltrimethoxysilane)) (surface decoration D) are adopted for the silane coupling agents, a methyl group, a vinyl group, an amino group and a thiol group result in the respective terminal groups on the substrate surface. In the case where the substrate is not treated with a silane coupling agent, a hydroxy group results in the terminal group on the substrate surface. The interactions with the nanoparticles which are expected according to the respective terminal groups are also summarized in Table 2.

Figure 2A:
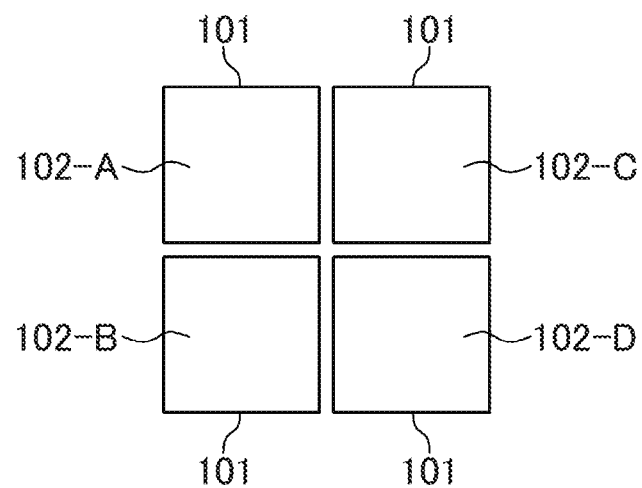
FIG. 2A is a schematic plan view in structure illustrating one example (including plural substrates) of a surface decorated substrate kit regarding a sample for measuring particles according to the first embodiment.
Figure 2B:
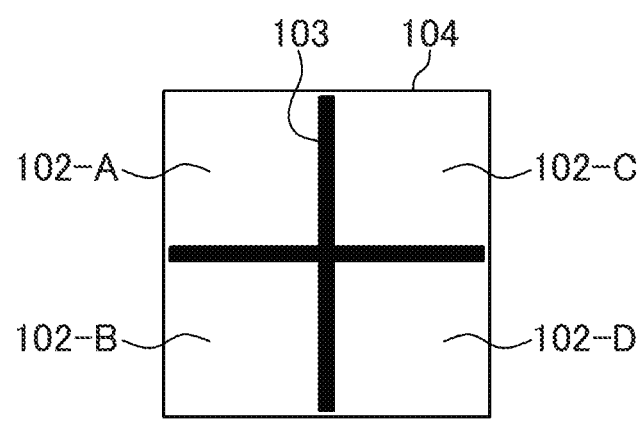
FIG. 2B is a schematic plan view in structure illustrating another example (including the single substrate) of a surface decorated substrate kit regarding a sample for measuring particles according to the first embodiment.

FIGS. 2A and 2B are views to schematically illustrate the structure of a surface decorated substrate kit. By selecting the combination of the standard nanoparticles and those to be measured as well as the combination of surface decorated substrates where appropriate, it allows the nanoparticles to be spread over the substrate with isolated from one another in terms of particulate disposition (as isolated particles). In this regard, when the nanoparticles to be measured are high molecular weight ones, metallic/alloy ones or inorganic ones, a surface decorated substrate kit is used with a plurality of surface decorated substrates combined with one another such that sufficient interaction among the nanoparticles and the surface decorated substrates is highly anticipated. For example, the surface decorated substrate kit which is decorated with the vinyl group (VTMS) by which organophilic property is anticipated, the thiol group (TMPT) by which metal-thiol bonding is anticipated and the hydroxyl group (hydrophilic treatment) by which hydrogen bonding is anticipated well responds to many kinds of those to be measured.

FIG. 2A is a plan view to schematically illustrate the structure of a surface decorated substrate kit in which a plurality of substrates is aligned with each other. FIG. 2A exemplifies the case where four surface decorated substrates are aligned with each other. Each substrate 101 is a silicon wafer whose size is 8 to 20 mm in square, in which the substrate areas 102-A to 102-D are decorated with the corresponding surface decorations A to D. The surface of each substrate 101 is decorated differently with the silane coupling agents illustrated in Table 2. FIG. 2B is a view to schematically illustrate the structure of a surface decorated substrate kit including the single substrate. The substrate 104 is a silicon wafer whose size is 18 to 42 mm in square and is divided into the substrate areas with a surface decoration separation band 103 made from e.g. a vinyl tape whose height is in the order of 0.5 mm after being subjected to hydrophilic treatment. The substrate 104 is prepared by dropping the silane coupling agents which are illustrated in Table 2 and correspond to the surface decorations A to D with respect to the corresponding substrate areas 102-A to 102-D so as to be spread over the substrate through spin coating once and for all; and by subjecting the substrate to heating and drying treatment.

The suspended solution containing the nanoparticles to be measured and the suspended solution containing the standard ones are dropped with respect to the surface decorated substrate kit and mixed with each other (refer to Steps 2.1 to 2.4 of FIG. 1). In other words, to begin with, 5 to 30µ liter of the suspended solution containing those to be measured is dropped with respect to the substrate areas 102-A to 102-D. Then, 5 to 30µ liter of the suspended solution containing the standard ones is dropped for mixing with respect to the droplet of the suspended solution containing those to be measured. In the case where the suspended solution containing both those to be measured and the standard ones is prepared, 10 to 60µ liter of the suspended solution is dropped with respect to the substrate areas 102-A to 102-D. Further, according to the combination of the nanoparticles to be measured, the standard ones, the suspended solution containing those to be measured and the suspended solution containing the standard ones, it is not necessarily essential to prepare a plurality of substrates, but the single substrate may suffice.

Table 3 illustrates an example of spreading the nanoparticles with respect to the surface decorated substrate. Table 3, with regard to the PSL nanoparticles, gold ones, silver ones and silica ones respectively, illustrates the relationship among a particle weight w, the number of particles n (the number of particles contained in a droplet), a particle to particle interval L (a particle to particle interval defined providing that the nanoparticles are distributed uniformly within a circle having a in diameter), which are calculated from a specific gravity p of a nanoparticle material, a diameter d of nanoparticles (nominal diameter of nanoparticle size), a concentration c of nanoparticles contained in the suspended solution, a drop volume v of the suspended solution and a diameter a of a droplet (a diameter of a ring-shaped precipitation of nanoparticles after the droplet is dried), and the ratio of a particle to particle interval L to a diameter d of nanoparticles (L/d). Table 3 further illustrates an example of spreading nanoparticles in the case where silica nanoparticles are defined as those to be measured while silver nanoparticles are defined as the standard ones. In this regard, it is preferred that the value of the ratio of the particle to particle interval L to the diameter d of nanoparticles range from in the order of 2 to 8 with the concentration c of the nanoparticles contained in the suspended solution and the drop volume v of the suspended solution varied.

TABLE 3

| Labeled condition | Nanoparticle species | Specific gravity ρ gw/cm³ | Diameter of nanoparticles d nm | Concentration c mgw/ml | Drop volume v ml | Diameter of droplet a mm | Particle weight w gw |
|---|---|---|---|---|---|---|---|
| a | PSL | 1.05 | 100 | 0.01 | 0.01 | 3 | 5.5.E−16 |
| b | Gold | 19.30 | 30 | 0.01 | 0.01 | 4.5 | 2.7E−16 |
| c | Silver | 10.50 | 100 | 0.02 | 0.03 | 8 | 5.5.E−15 |
| d | Silica | 2.00 | 120 | 0.02 | 0.02 | 5 | 1.8E−15 |
| e | Silver | 10.50 | 75 | 0.02 | 0.01 | 5 | 2.3E−15 |
|   | Silica | 2.00 | 100 | 0.02 | 0.01 | 5 | 1.0E−15 |

| Labeled condition | Number of particle n | Particle to particle interval L nm | Number of particles contained in 1 µm in square | Substrate treatment | Drying condition | L/d |
|---|---|---|---|---|---|---|
| a | 1.8E+08 | 212 | 25.7 | TMPT | Horizontal dried for 15 hrs | 2.12 |
| b | 3.7E+08 | 224 | 23.0 | VTMS (1/5) | Horizontal dried for 15 hrs | 7.46 |
| c | 1.1E+08 | 729 | 2.7 | Hydrophilic treatment | Horizontal dried for 15 hrs | 7.29 |
| d | 2.7E+08 | 320 | 11.3 | VTMS (1/5) | Horizontal dried for 15 hrs | 2.67 |
| e | 8.6E+07 | 513 | 4.4 | Hydrophilic treatment | Horizontal dried for 15 hrs | 6.84 |
|   | 1.9E+08 | 345 | 9.7 |   |   | 3.45 |

3. Drying Droplet

Figure 3A:
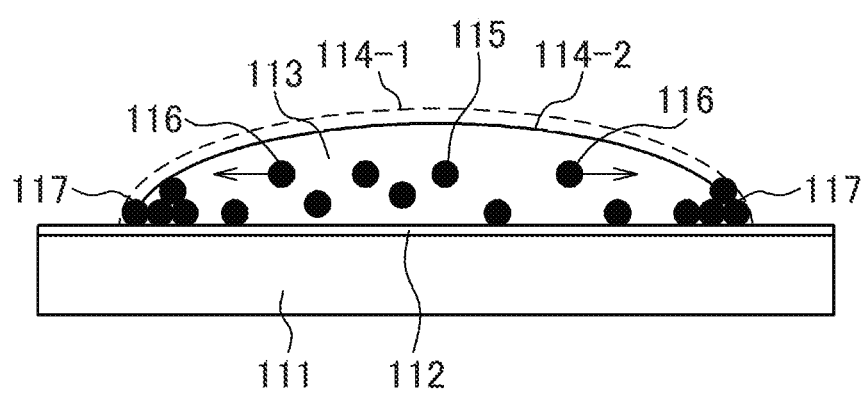
FIG. 3A is an exemplary cross-sectional view to explain the state where a droplet containing nanoparticles is being dried.

The suspended droplet is naturally dried in such a way that a substrate over which the nanoparticles are spread is obtained (refer to Step 3 of FIG. 1). FIG. 3A is an exemplary view to illustrate the cross-sectional view of the droplet being dried. The suspended droplet formed on the substrate 111 which is decorated with a surface decoration 112 is gradually dried according as time passes so as for the liquid surface 114-1 of the droplet to gradually get smaller as illustrated with the liquid surface 114-2. The droplet is composed of a solution 113 and nanoparticles 115, in which the movement of the solution directed from the inner side of the droplet to the outer sides thereof arises because the speed with which the solvent evaporates is larger at the outer sides thereof (right and left sides according to the illustration of FIG. 3A) than the inner side thereof. For the same reason, the movement of the nanoparticles 116 among the nanoparticles 115 directed to the outer sides thereof arises. The nanoparticles 115 are precipitated on the substrate according to such conditions as the interaction among the surface decoration 112 and the nanoparticles 115, the concentration of the nanoparticles 115 contained in the suspended solution and the ease with which the nanoparticles 115 are suspended in the solution 113. The nanoparticles 116 moving to the outer sides of the droplet cause their concentration at the outer sides of the droplet to be enhanced so as to facilitate them to be precipitated, which leads to the formation of a ring-shaped precipitation 117 at the outer sides of the droplet. This phenomenon is generally known as coffee ring effect (coffee stain).

Figure 3B:
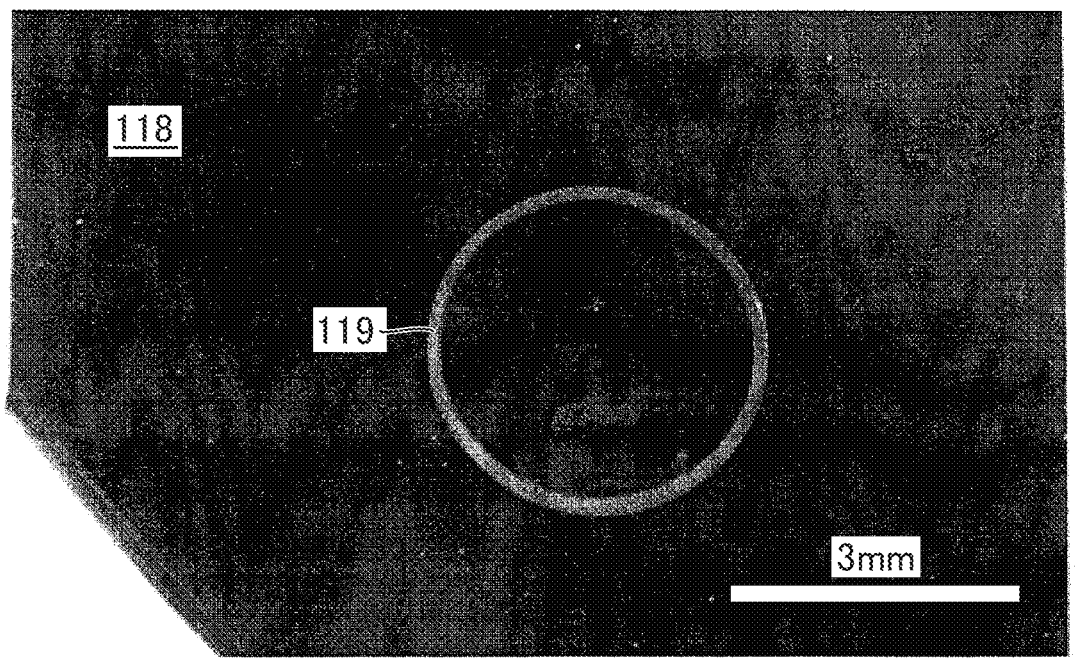
FIG. 3B is an exemplary image taken by an optical microscope when the substrate is viewed from above after the droplet containing nanoparticles is dried.

FIG. 3B exemplifies an image of the substrate after the droplet is dried which is taken by an optical microscope, in which the ring-shaped precipitation 119 of nanoparticles is observed within the surface decorated substrate 118 after the droplet is dried. With such ring-shaped precipitation 119 of nanoparticles, it often happens that the nanoparticles are precipitated with aggregated in a multi-layered manner, so that it is ten to one inappropriate to measure the height and shape of the nanoparticles there. In the case where the concentration of the dispersing agent contained in the suspended solution is not lower, most of such agent remains in the solution up to the last stage of drying the droplet and is crystallized to the inner side (mostly in the vicinity of the droplet center) with respect to the ring-shaped precipitation of nanoparticles (such crystallization not being depicted according to the illustration of FIG. 3B).

Figure 4A:
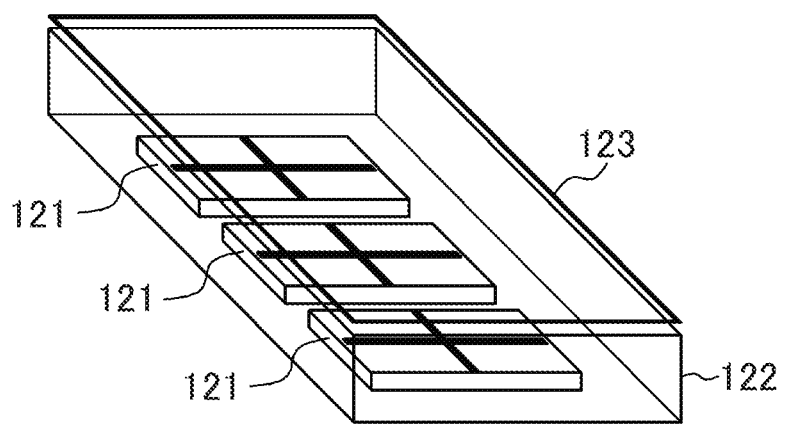
FIG. 4A is a schematic bird's eye view in structure illustrating one example of a droplet drying kit used upon a sample for measuring particles according to the first embodiment being prepared.

In the case where the suspended droplet is dried in an open system, 10µ liter of droplet is dried for about one to two hours. Just if the interaction illustrated with reference to FIG. 3A between the surface decoration 112 and the nanoparticles 115 goes smooth and proper, by evaporating the solvent slowly with the time required for drying the droplet prolonged, it prevents the nanoparticles from being clustered. FIG. 4A is a bird's eye view to schematically illustrate the structure of the droplet drying kit. With the surface decorated substrate kits 121 illustrated in FIGS. 2A and 2B, by covering and enclosing them with a sample container 122, the time required for drying the droplet can be prolonged, in which by regulating the gap between the sample container 122 and a lid 123, it allows the time required for drying the same to increase or decrease. By making the gap between the sample container 122 and the lid 123 in the order of 0.1 mm, it permits 20µ liter of droplet to be dried for about 15 hours. Table 3 representatively defines the prolonged time for drying the same as 15 hours.

Figure 4B:
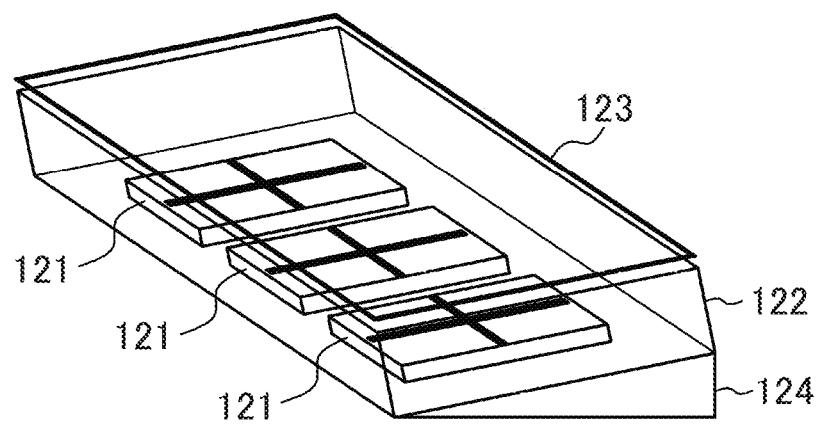
FIG. 4B is a schematic bird's eye view in structure illustrating another example (tilted drying mode) of a droplet drying kit used upon a sample for measuring particles according to the first embodiment being prepared.

Normally, the surface decorated substrate kits 121 received in the sample container 122 and placed on the desktop are substantially horizontally kept in place. In the case where the concentration of the dispersing agent contained in the solution is higher, there are some cases where such agent is precipitated and crystallized around the nanoparticles with using the nanoparticles precipitated on the substrate during the prolonged time for drying the droplet as nuclei. In this case, such problem is overcome by drying the surface decorated substrate kits 121 comparatively in a short time with tilted by in the order of 5 to 10 degrees. FIG. 4B is a bird's eye view to schematically illustrate the structure of the droplet drying kit adopting such tilted drying mode. The sample container 122 is tilted by a sloped platform 124, in which the gap between the sample container 122 and the lid 123 is kept at about 2 mm. In this mode, 20µ liter of droplet is dried for about two to three hours.

4. Selection of Measurement Location on Substrate after Droplet Dried

Such a ring-shaped precipitation 119 of nanoparticles is observed on the substrate after the droplet is dried as illustrated in FIG. 3B with an image taken by an optical microscope. In many cases, the nanoparticles are precipitated slightly to the inner side of the ring-shaped precipitation 119 of nanoparticles. However, there are some cases where they are precipitated slightly to the outer side of such ring-shaped precipitation 119. The location of the dried droplet where particle density is appropriate is selected while observing with an optical microscope; and an image of such location is acquired with an atomic force microscope (AFM), thereby, the spot to be measured is selected (refer to 4 of FIG. 1). With the screen in which particles are measured, in terms of the AFM screen, such a screen is desirable as 300 or more nanoparticles to be measured and as many standard ones being dispersed therein, but information on the shapes of nanoparticles can be consolidated through a plurality of AFM images as well.

Figure 5A:
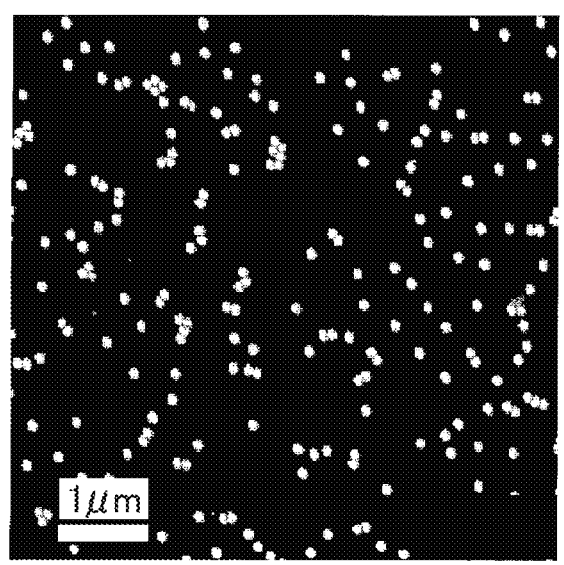
FIG. 5A is an exemplary AFM image of nanoparticles in which a labeled condition a illustrated in Table 3 is spread over a surface decoration substrate regarding a sample for measuring particles according to the first embodiment.

FIGS. 5A to 5E exemplify the AFM images of nanoparticles spread over the surface decorated substrate. The images of FIGS. 5A to 5E are according to the labeled conditions a, b, c, d and e of Table 3 in which it is exemplified that the corresponding nanoparticles are spread over the surface decorated substrate and with the drying condition of the droplet, the surface decorated substrate kits are subjected to the prolonged drying operation with horizontally kept in place. FIG. 5A illustrates an example of spreading the PSL nanoparticles over the substrate whose surface is treated with the TMPT, in which the nanoparticles are spread over the substrate with isolated from one another in terms of particulate disposition or isolated particles are spread over the substrate in an ideal manner. This is considered due to the —COOH groups on the surface of the PSL nanoparticles being chemically bonded with —SH groups of the surface decorated substrate through thioester bonding.

Figure 5B:
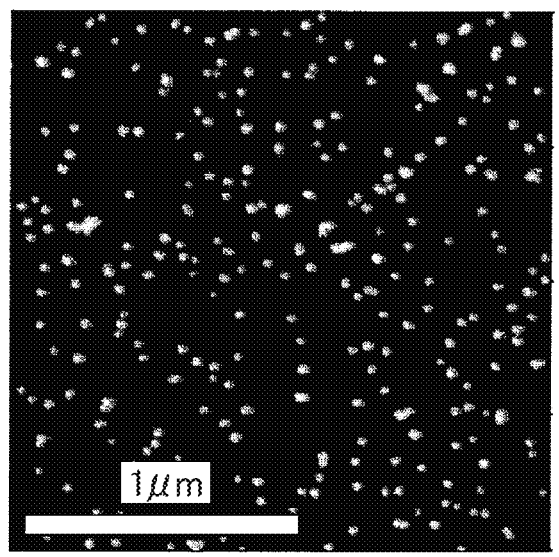
FIG. 5B is an exemplary AFM image of nanoparticles in which a labeled condition b illustrated in Table 3 is spread over a surface decoration substrate regarding a sample for measuring particles according to the first embodiment.
Figure 5C:
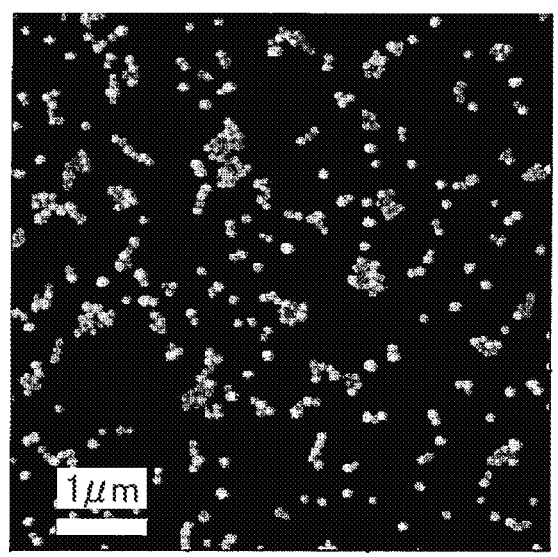
FIG. 5C is an exemplary AFM image of nanoparticles in which a labeled condition c illustrated in Table 3 is spread over a surface decoration substrate regarding a sample for measuring particles according to the first embodiment.
Figure 5D:
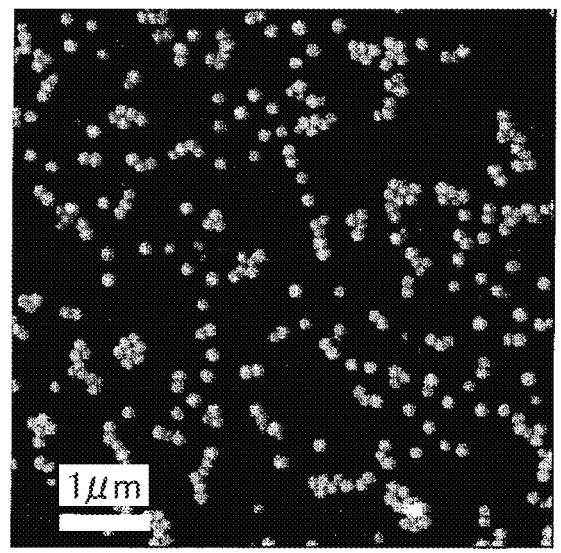
FIG. 5D is an exemplary AFM image of nanoparticles in which a labeled condition d illustrated in Table 3 is spread over a surface decoration substrate regarding a sample for measuring particles according to the first embodiment.

FIG. 5B illustrates an example of spreading metallic nanoparticles over the substrate whose surface is treated with VTMS (whose concentration is diluted by one-fifth with toluene), in which isolated particles are spread over the substrate in an ideal manner. FIG. 5C illustrates an example of spreading silver nanoparticles over the substrate whose surface is subjected to hydrophilic treatment while FIG. 5D illustrates an example of spreading silica nanoparticles over the substrate whose surface is treated with VTMS (whose concentration is diluted by one-fifth with toluene), in both of which isolated particles are spread over the substrate in a comparatively ideal manner.

Table 4 illustrates the ease with which the nanoparticles are spread over the substrate with isolated from one another in terms of particulate disposition (isolated particles being spread over the substrate) according to the combination of surface decoration treatments, surface decorated groups and nanoparticles. The double circle, the circle, the triangle and the crisscross in Table 4 demonstrates the case where isolated particles are spread over the substrate in an ideal manner; the case where they are spread over the substrate in a comparatively ideal manner; the case where they are spread over the substrate in a partial manner; and the case where they are not spread over the substrate, but are aggregated in terms of particulate disposition (clustered nanoparticles) respectively.

TABLE 4

| Nanoparticle species | HMDS —CH$_3$ | VTMS (one-fifth) —CH=CH$_2$ | TMPT —SH | Hydrophilic treatment —OH |
|---|---|---|---|---|
| PSL | ○ | Δ | ◎ | Δ |
| Gold | Δ | ◎ | Δ | ○ |
| Silver | Δ | ◎ | X | ○ |
| Silica | X | ○ | X | ◎ |

Figure 5E:
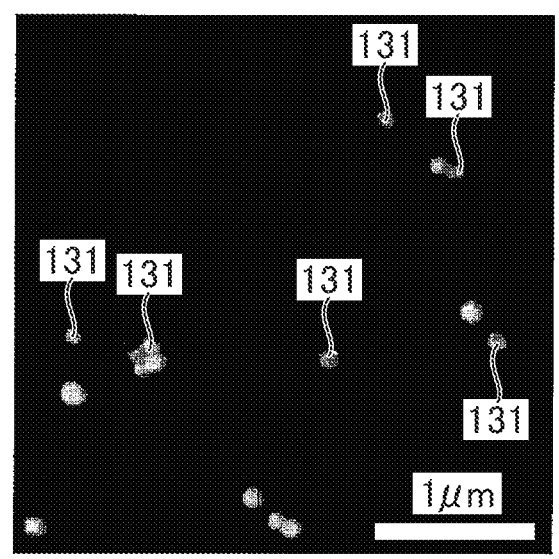
FIG. 5E is an exemplary AFM image of nanoparticles in which a labeled condition e illustrated in Table 3 is spread over a surface decoration substrate regarding a sample for measuring particles according to the first embodiment.

FIG. 5E illustrates an example of spreading silica nanoparticles adopted for those to be measured and silver nanoparticles adopted for the standard ones over the substrate whose surface is subjected to hydrophilic treatment with the AFM image showing the state of the mixed droplets dried for a long time subsequent to the suspended solution of 10µ liter of silver nanoparticles being dropped with respect to the dropped suspended solution of 10µ liter of silica nanoparticles, in which it is found the isolated particles of both species are spread over the substrate in a comparatively ideal manner.

5. Measurement of Three-Dimensional Shape Image and Physical Property Image

At the spot to be measured or selected through the AFM image, the shape image (AFM image) and the physical property images (viscosity image, friction force image, electric current image and magnetic force image) are measured through SPM where necessary (refer to Step 5 of FIG. 1). The image by AFM is one screen image (shape image) or an image of two screens simultaneously measured (shape image plus phase image) while that by SPM is an image of two screens simultaneously measured (shape image plus physical property image).

6. Removal of Noises Through Smoothing of Image

As regards the obtained AFM images, data processing to level out the substrate is performed (refer to Step 6 of FIG. 1) because the height of the substrate is not necessarily constant (level) and there is intervention of thermal drift and drift in the vertical direction resulting from the apparatus itself. Further, the images obtained through AFM and those obtained through SPM are subjected to such noise removal as smoothing and frequency selective filtering such that the subsequent data processing is performed with precision (refer to Step 6 of FIG. 1).

7. Discrimination of Standard Nanoparticles, Three-Dimensional Shape Rectification of Nanoparticles to be Measured Through Three-Dimensional Shape of Standard Ones With the obtained AFM and SPM images in use, the nanoparticles to be measured and the standard ones are discriminated from one another (refer to Step 7 of FIG. 1). They are discriminated from one another based on information on the particulate shape (height, aspect ratio, circularity, asperity, phase roughness) and information on physical properties (viscosity, friction force on the surface, electrical conductivity, magnetic property). An example of discriminating those to be measured from the standard ones according to the height of nanoparticles is presented herein with silica nanoparticles respectively having 100 nm in average particle size adopted for those to be measured and silver ones respectively having 75 nm in average particle size adopted for the standard ones. The detailed method of how to discriminate nanoparticles is described later.

Figure 6:
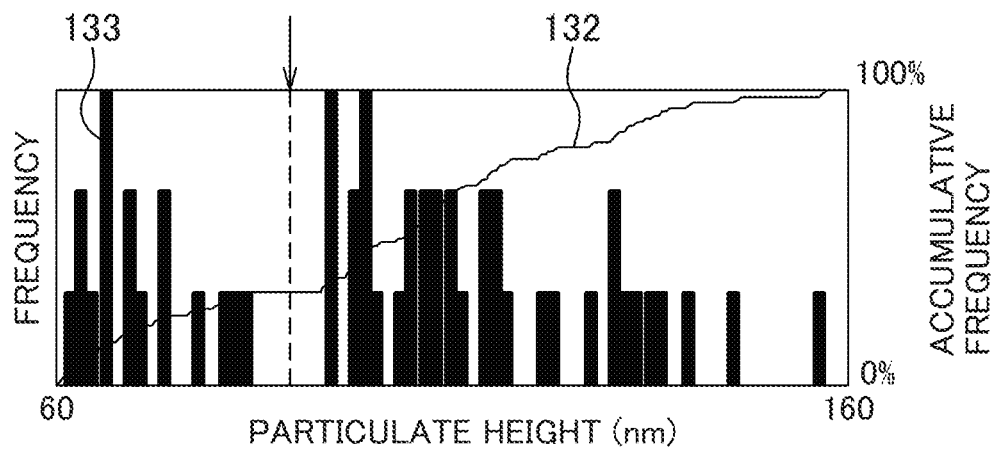
FIG. 6 is a graph to explain a discriminated example of nanoparticles according to information on the particulate shape (distribution of particulate heights) regarding a sample for measuring particles according to the first embodiment.

FIG. 5E illustrates an example of the AFM image showing the silica nanoparticles and silver ones which are spread over the substrate whose surface is subjected to hydrophilic treatment according to the spreading condition of the labeled condition e of Table 3. FIG. 6 illustrates an example of discriminating nanoparticles according to information on the particulate shape (distribution of their heights). FIG. 6 illustrates the result of the AFM image analyzed and viewed from a different angle with the same spread substrate as illustrated in FIG. 5E, in which bar graphs 133 indicate the distribution of particulate heights while the stepped line chart 132 indicating the accumulative frequency of particulate heights.

The arrow and broken line represented in FIG. 6 indicate the location corresponding to the particulate height of 90 nm. The distribution of particulate heights is divided into two categories at the right and left sides of the broken line, in which it is found the discrimination of nanoparticles is feasible with the distribution of particulate heights. The left side of the broken line corresponds to silver nanoparticles adopted for the standard ones while the right side thereof corresponding to the silica ones adopted for those to be measured. In this relation, the average particulate height and standard deviation of the silver ones are 75.3 nm and 7.2 nm while those of the silica ones are 102.2 nm and 10.4 nm. Discriminating the nanoparticles illustrated in FIG. 5E providing that the average particulate height of 90 nm or smaller corresponds to the silver ones while that of 90 nm or larger corresponding to the silica ones, six nanoparticles 131 correspond to the silver ones and the rest correspond to the silica ones as a result.

Figure 7:
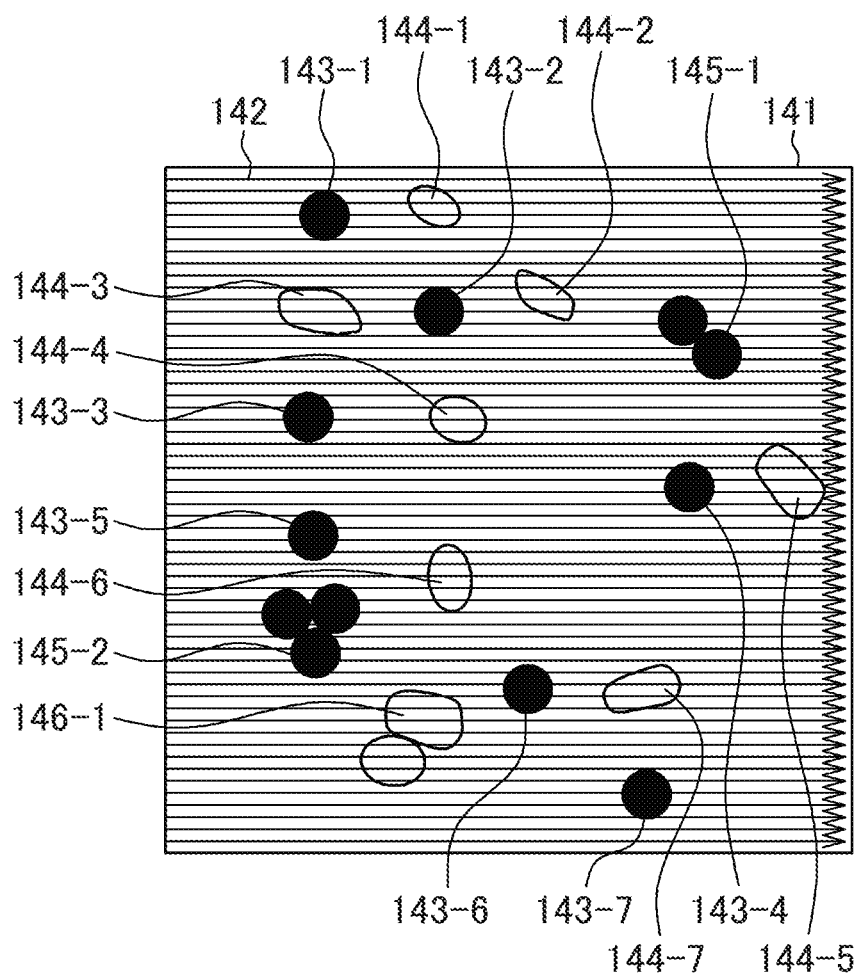
FIG. 7 is a conceptual plan view to explain the steps of measuring the particulate shape according to AFM and those of rectifying the three-dimensional particulate shape regarding a method for measuring particles according to the first embodiment.

FIG. 7 is a conceptual plan view to explain the steps of measuring the particulate shape according to AFM and those of rectifying the three-dimensional particulate shape. With the particulate shape measurement according to AFM, a probe is scanned along the measuring scanning line 142; and information on the heights of the probe is recorded. There are number of measuring scanning lines 142 on the measuring screen 141 which are equi-distantly provided to one another in the linear scanning direction. According to the illustration of FIG. 7, it is envisaged that the measuring scanning lines 142 are sequentially scanned from the top to the bottom (raster scanning method).

According to the illustration of FIG. 7, it is envisaged that there are standard nanoparticles isolated from one another in terms of particulate disposition (isolated standard ones) 143-1 to 143-7 as well as those to be measured isolated from one another in terms of particulate disposition (isolated ones to be measured) 144-1 to 144-7. With the substrate over which nanoparticles are spread, all of them are not necessarily isolated from one another, but there are aggregated standard ones in terms of particulate disposition (clustered standard ones) 145-1 and 145-2 as well as aggregated ones to be measured (clustered ones to be measured) 146-1, in which the latter are not used for measuring the three-dimensional particulate shape herein, but can be used for measuring the particulate height. Further, the clustered nanoparticles can be used for measuring the three-dimensional particulate shape by expanding the scope of the method of rectifying the three-dimensional particulate shape. For the method of dividing information on the particulate measurement for each nanoparticle, the way of separating them piece by piece into each nanoparticle through e.g. the watershed method with information on the particulate shape in use can be adopted, which also applies to the case where they form clusters.

According to the illustration of FIG. 7, information on the particulate shape is sequentially measured from the top to the bottom of the measuring scanning lines 142, but for the rectification of the three-dimensional particulate shape, information on the shape of the isolated standard ones present in the vicinity of the isolated ones to be measured are used. In other words, to begin with, the three-dimensional shape of the isolated one to be measured 144-1 is rectified based on information on the shape of the isolated standard one 143-1. Then, the three-dimensional shapes of the isolated ones to be measured 144-2 and 144-3 are rectified based on information on the shape of the isolated standard one 143-2. In the same way as above, the three-dimensional shape of the isolated one to be measured 144-4 is rectified based on information on the shape of the isolated standard one 143-3; that of the isolated one to be measured 144-5 is rectified based on information on the shape of the isolated standard one 143-4; that of the isolated one to be measured 144-6 is rectified based on information on the shape of the isolated standard one 143-5; and that of the isolated one to be measured 144-7 is rectified based on information on the shape of the isolated standard one 143-6 (refer to 7 of FIG. 1).

Figure 8:
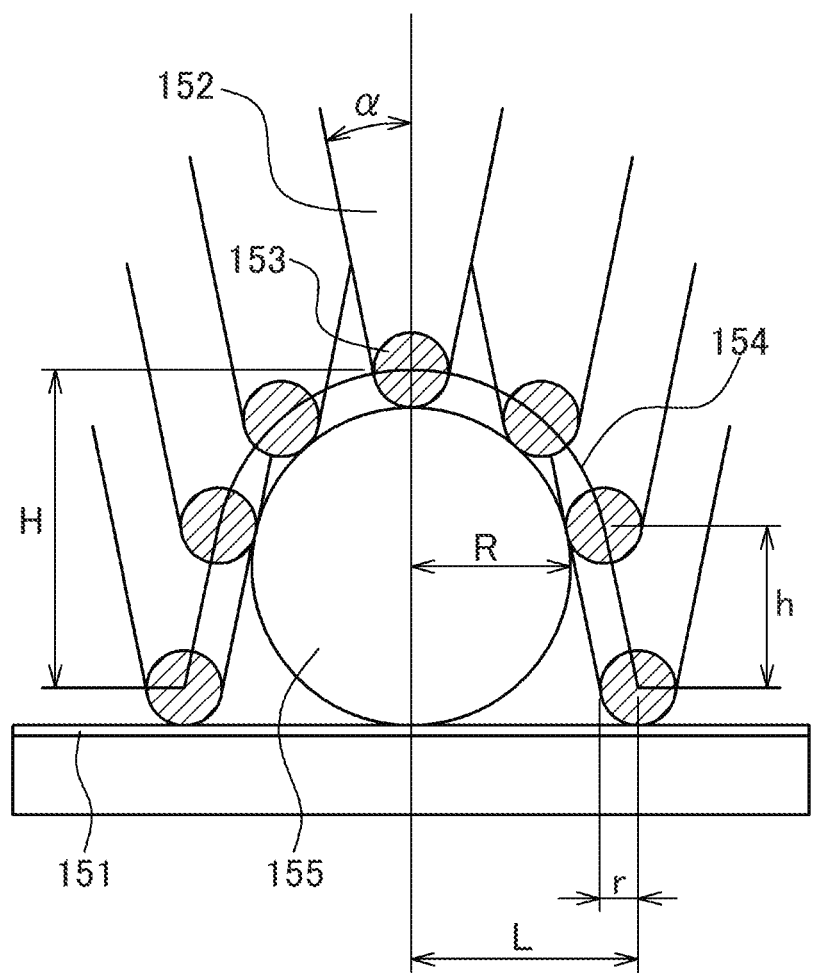
FIG. 8 is a conceptual cross-sectional view to explain the steps of measuring the particulate shape according to AFM regarding a method for measuring particles according to the first embodiment.

FIG. 8 is a conceptual cross-sectional view to explain the particulate shape measurement according to AFM. Herein, with reference to FIG. 8, the method of acquiring information on the shape of a probe based on information on the shape of the isolated standard nanoparticle and the method of rectifying the three-dimensional shape of the isolated nanoparticle to be measured are exemplified, but other generally known methods may be adopted instead of the method of rectifying the three-dimensional particulate shape exemplified herein. According to the illustration of FIG. 8, there is one nanoparticle 155 having R in radius on the substrate 151 whose surface is decorated. Assuming that the cone-shaped probe 152 includes a tip end 153 approximating to a sphere having r in radius and a part of the cone having α in half-angle, the locus 154 of the probe according to the AFM measurement with the nanoparticle corresponds to a locus along which the center of the tip end 153 approximating to the sphere passes.

In this regard, the locus 154 of the probe according to the AFM measurement with the nanoparticle corresponds to the cross-sectional shape of the nanoparticle according to AFM representing information on its shape, the numeric values of the height H of the nanoparticle, the apparent half-width L of the nanoparticle and the height h of the inflection point on the locus 154 are given by information on the shape of the nanoparticle. As for the numeric values of the radius R of the nanoparticle 155, the radius r of the tip end 153 and the half-angle α of the cone-shaped probe 152, they are calculated as follows employing H, L and h.

Equation 1

$$H = 2R \tag{1}$$

Equation 2

$$h = R - r + (R+r)\sin\alpha \tag{2}$$

Equation 3

$$L = (R+r)\cos\alpha + h\tan\alpha \tag{3}$$

They are given in the form of solutions to the above simultaneous equations.

Figure 9:
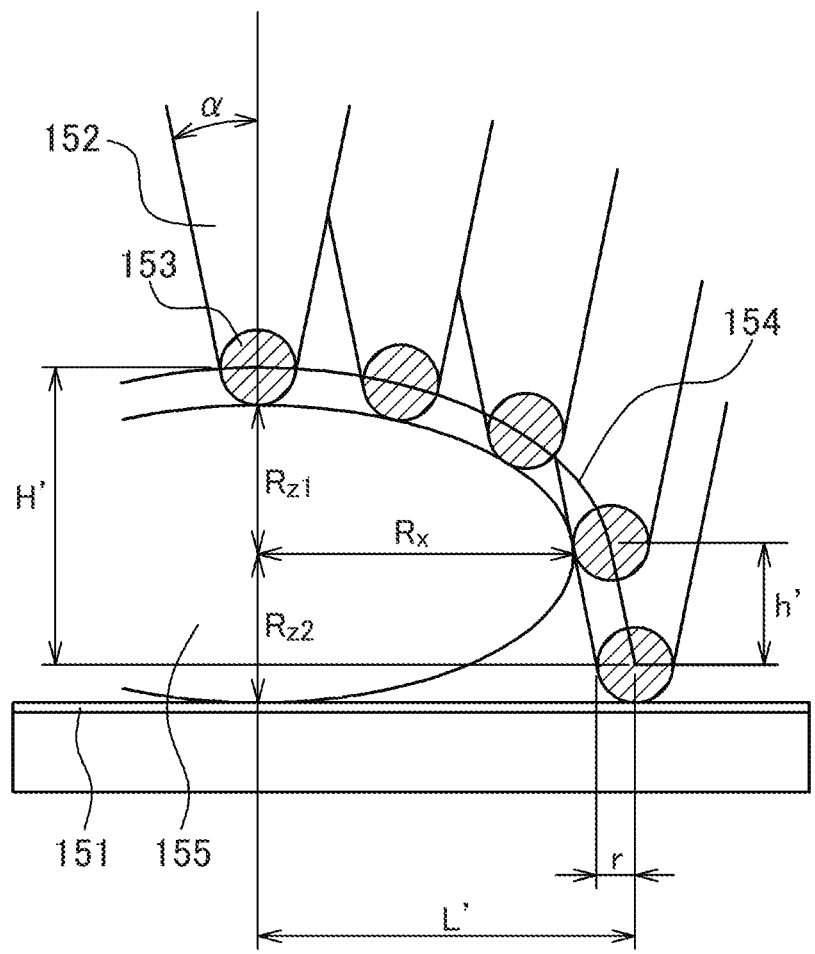
FIG. 9 is a conceptual cross-sectional view to explain the steps of measuring the shape of non-spherical nanoparticles according to AFM regarding a method for measuring particles according to the first embodiment.

FIG. 9 is a conceptual cross-sectional view to explain the steps of measuring the shape of a non-spherical nanoparticle according to AFM. Considering the cross section of the isolated nanoparticle to be measured which is a non-spherical one, as illustrated in FIG. 9, the radii in the vertical direction with respect to the substrate are defined as $R_{z1}$ and $R_{z2}$ and the radius in the horizontal direction with respect to the substrate is defined as $R_x$. Based on information on the shape of the nanoparticle according to AFM, the height of the nanoparticle H', the apparent half-width L' of the nanoparticle and the height h' of the inflection point are obtained. As for the numeric values of $R_{z1}$, $R_{z2}$ and $R_x$ included in information on the shape of the isolated nanoparticle to be measured, they are calculated as follows employing r, α, H', L' and h'.

Equation 4

$$H' = R_{z1} + R_{z2} \tag{4}$$

Equation 5

$$h' = R_{z2} - r + (R_x + r)\sin\alpha \tag{5}$$

Equation 6

$$L' = (R_x + r)\cos\alpha + h'\tan\alpha \tag{6}$$

They are given in the form of solutions to the above simultaneous equations. In this regard, information on the cross-sectional shape of the isolated nanoparticle to be measured including the radius $R_x$ in the horizontal direction at random with respect to the substrate can be obtained, so that the cross-sectional length $R_x$ at random of the isolated nanoparticle to be measured can be calculated.

8. Discrimination of Nanoparticle Species to be Measured

In the case where there are plural nanoparticles to be measured, they are discriminated from one another based on information on the particulate shape (height, aspect ratio, circularity, asperity, phase roughness) and information on physical properties (viscosity, friction force on the surface, electrical conductivity, magnetic property) (refer to 8 of FIG. 1). The detailed method of discriminating nanoparticles is described later.

9. Analysis of Average Particle Size, Standard Deviation of Particle Sizes and Particle Size Distribution of Nanoparticles to be Measured The average particle size, the standard deviation of the particle sizes and the particle size distribution are found for each species of the nanoparticles to be measured (refer to Step 9 of FIG. 1).

According to the embodiment, it allows a sample for measuring particles, a method for measuring particles and an apparatus for measuring particles which enable the three-dimensional particulate shape to be measured and the particulate species to be evaluated to be provided.

Second Embodiment

A second embodiment according to the present invention is explained as follows. To note, what is described in the first embodiment and is not described in the embodiment is also applicable to the latter unless specified otherwise.

In the embodiment, exemplifying the measurement by a scanning probe microscope (SPM), the method of discriminating particulate species according to information on the particulate shape (height, aspect ratio, circularity, asperity, phase roughness) and information on physical properties (viscosity, friction force on the surface, electrical conductivity, magnetic property) is disclosed. What is referred herein to as discriminating the particulate species includes both the discrimination among the nanoparticles to be measured and the standard ones and the discrimination of the species of those to be measured.

Method of Discriminating Nanoparticles according to Data on their Shape (1-1) Height Method As explained with reference to the image of FIG. 5E according to the first embodiment, the nanoparticles are discriminated from one another according to the distribution of the particulate heights. Employing the distribution of the particulate heights as illustrated in FIG. 6 according to the first embodiment with information on the particulate shape analyzed, the particulate species are discriminated from one another with a threshold value set to the particulate height. In this relation, it is preferred that the distributions of the heights of those to be measured and the heights of the standard ones be discrete from each other or the distributions of the heights of each particulate species of those to be measured be discrete from one another (overlapping to be disregarded), but the overlapping of the distributions of the heights can be typically rectified with a plurality of nanoparticles to be measured which have a different average height from one another in use.

(1-2) Aspect Ratio Method

As explained with reference to the illustration of FIG. 9 according to the first embodiment, according to the measurement of the particulate shape by AFM, information on the height or $R_{z1}$ and $R_{z2}$ of the isolated nanoparticle to be measured are obtained, and the half-width $R_x$ of the nanoparticle in the horizontal direction with respect to the substrate at the vertical cross section at random of the isolated nanoparticle to be measured can be calculated. Such three-dimensional information allows the precise horizontal and vertical cross-sectional shapes of the nanoparticle representing information on its shape to be obtained. To simplify the procedure, according to information on the particulate shape by AFM, the horizontal cross-sectional shape of the nanoparticle representing information on its shape is obtained with a threshold value set to the particulate height. Further, the vertical cross section of the nanoparticle is obtained based on the section which passes the highest point of the nanoparticle.

According to the aspect ratio method, the particulate major axis (the largest length in cross section) of the above particulate cross-sectional image and the particulate minor axis (the smallest length in cross section or length in the vertical direction with respect to the major axis) are found for each particle.

Equation 7

Aspect Ratio ($A_s$)=Ratio of Particulate Major Axis to Particulate Minor Axis (7)

The aspect ratio is calculated according to the above equation. For instance, with the standard nanoparticle approximating to complete sphere, $A_s \approx 1$. The particulate species are discriminated from one another with a threshold value set to such aspect ratio.

(1-3) Circularity (Circular Approximation in Cross Section) Method

The fitting of the cross-sectional shape of the nanoparticle with the whole or a part of a circle is carried out, and a squared residual with the circle approximating to the cross-sectional shape of the nanoparticle is found for each nanoparticle. The particulate species are discriminated from one another with a threshold value set to such squared residual.

(1-4) Asperity (Shape) Method

The nanoparticles are discriminated from one another according to information on the roughness (asperity) of the shape image by AFM. For the method of dividing information on the particulate measurement for each nanoparticle, the way of separating them piece by piece into each nanoparticle through e.g. the watershed method with information on the particulate shape in use can be adopted, which also applies to the case where they form clusters.

With respect to the shape image of each nanoparticle, an analysis area is defined for each nanoparticle from the particulate boundary towards the particulate center with the exclusion of the particulate areas having the prescribed number of pixels. The RMS value of the asperity of the particulate surface is found at such analysis area. The particulate species are discriminated from one another with a threshold value set to the RMS value of the asperity for each nanoparticle. This method is optimal for applying to such particles whose surface is planar as the bumpy information on the surface shape not intervening into the asperity information.

Discrimination According to Data on Particulate Shape and Data on Particulate Phase (2) Phase Roughness Method The shape image by AFM and the phase image simultaneously measured therewith are put to use. For the method of dividing information on the particulate measurement for each nanoparticle, the way of separating them piece by piece into each nanoparticle through e.g. the watershed method with information on the particulate shape in use can be adopted, which also applies to the case where they form clusters. The shape image and the phase image simultaneously measured therewith are separated into the piece by piece particulate information for each nanoparticle.

With respect to the shape image and the phase image of each nanoparticle, an analysis area is defined for each nanoparticle from the particulate boundary towards the particulate center with the exclusion of the particulate areas having the prescribed number of pixels. What is obtained by adding up the RMS values of the phases of the particulate surfaces and dividing the added-up value by the area of the analysis area (which results in phase roughness) is found at such analysis area for each nanoparticle. The particulate species are discriminated from one another with a threshold value set to the phase roughness of each nanoparticle. According to this method, information on the periphery of nanoparticles whose phase image largely changes are excluded and the bumpy information on the particulate surface shape do not intervene into the phase image, so that threshold values optimal for the discrimination are obtained in many cases.

Discrimination Method According to Data on Particulate Shape and Data on Particulate Physical Property (3-1) Viscosity Method The shape image by AFM and the viscosity image simultaneously measured (by SPM) therewith are put to use. For the method of dividing information on the particulate measurement for each nanoparticle, the way of separating them piece by piece into each nanoparticle through e.g. the watershed method with information on the particulate shape in use can be adopted, which also applies to the case where they form clusters. The shape image and the viscosity image simultaneously measured therewith are separated into the piece-by piece particulate information for each nanoparticle.

With respect to the shape image and the viscosity image of each nanoparticle, an analysis area is defined for each nanoparticle from the particulate boundary towards the particulate center with the exclusion of the particulate areas having the prescribed number of pixels. What is obtained by adding up elastic values and viscous values and dividing the added-up value by the number of pixels of the analysis area is found at such analysis area for each nanoparticle. The particulate species are discriminated from one another with a threshold value set to the elasticity or viscosity of each nanoparticle. This method is optimal for discriminating the particles which have large difference in hardness (e.g. silver whose Young's modulus is 83 GPa and PSL whose Young's modulus is 4 GPa).

(3-2) Friction Force Method

The shape image by AFM and the friction force image simultaneously measured (by SPM) therewith are put to use. For the method of dividing information on the particulate measurement for each nanoparticle, the way of separating them piece by piece into each nanoparticle through e.g. the watershed method with information on the particulate shape in use can be adopted, which also applies to the case where they form clusters. The shape image and the friction force image simultaneously measured therewith are separated into the piece by piece particulate information for each nanoparticle.

With respect to the shape image and the friction force image of each nanoparticle, an analysis area is defined for each nanoparticle from the particulate boundary towards the particulate center with the exclusion of the particulate areas having the prescribed number of pixels. What is obtained by adding up friction forces and dividing the added-up value by the number of pixels of the analysis area is found at such analysis area for each nanoparticle. The particulate species are discriminated from one another with a threshold set to the friction force of each nanoparticle. This method is optimal for discriminating the particles which have large difference in friction force (e.g. silica and PSL).

(3-3) Electrical Conductivity Method

The shape image by AFM and the electric current image simultaneously measured (by SPM) therewith are put to use. For the method of dividing information on the particulate measurement for each nanoparticle, the way of separating them piece by piece into each nanoparticle through e.g. the watershed method with information on the particulate shape in use can be adopted, which also applies to the case where they form clusters. The shape image and the electric current image simultaneously measured therewith are separated into the piece by piece particulate information for each nanoparticle.

With respect to the shape image and the electric current image of each nanoparticle, an analysis area is defined for each nanoparticle from the particulate boundary towards the particulate center with the exclusion of the particulate areas having the prescribed number of pixels. What is obtained by adding up electric resistances and dividing the added-up value by the number of pixels of the analysis area is found at such analysis area for each nanoparticle. The particulate species are discriminated from one another with a threshold set to the electrical conductivity of each nanoparticle. This method is optimal for discriminating the particles which have large difference in electrical conductivity (e.g. precious metal nanoparticles and PSL ones).

(3-4) Magnetic Property Method

The shape image by AFM and the magnetic force image simultaneously measured (by SPM) therewith are put to use. For the method of dividing information on the particulate measurement for each nanoparticle, the way of separating them piece by piece into each nanoparticle through e.g. the watershed method with information on the particulate shape in use can be adopted, which also applies to the case where they form clusters.

The shape image and the magnetic force image simultaneously measured are separated into the piece by piece particulate information for each nanoparticle. With respect to the shape image and the magnetic force image of each nanoparticle, an analysis area is defined for each nanoparticle from the particulate boundary towards the particulate center with the exclusion of the particulate areas having the prescribed number of pixels. What is obtained by adding up magnetic forces and dividing the added-up value by the number of pixels of the analysis area is found at such analysis area for each nanoparticle. The particulate species are discriminated from one another with a threshold value set to the magnetic force of each nanoparticle. This method is optimal for discriminating the particles which have large difference in magnetic force (e.g. magnetic particles and non-magnetic particles).

According to the embodiment, it allows a sample for measuring particles, a method for measuring particles and an apparatus for measuring particles which enable the three-dimensional particulate shape to be measured and the particulate species to be evaluated to be provided.

Third Embodiment

A third embodiment according to the present invention is explained with reference to the images of FIGS. 11 and 12. To note, what is described in the first and second embodiments and is not described in the embodiment is also applicable to the latter unless specified otherwise.

Figure 10:
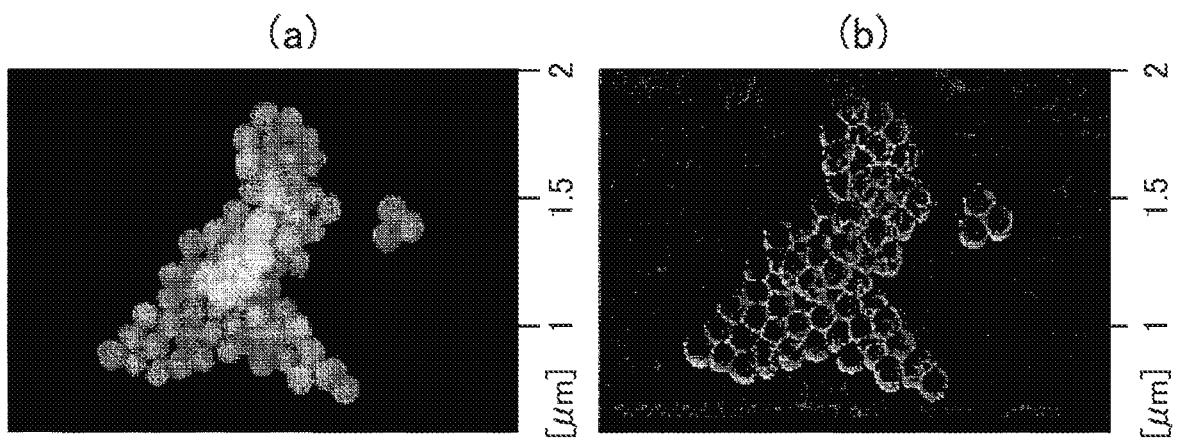
FIG. 10 shows images in which silver nanoparticles and PSL nanoparticles are contained: (a) illustrating a shape image while (b) illustrating a phase image regarding a sample for measuring particles according to a third embodiment of the present invention.

According to the embodiment, it is exemplified that the clustered nanoparticles in mixture among the silver ones and the PSL ones are discriminated from one another with the shape image by AFM and the phase image simultaneously measured therewith in use. FIG. 10 shows the image of the silver nanoparticles and the PSL ones, in which (a) illustrates the shape image while (b) illustrating the phase image. FIG. 11 shows an image in which the respective nanoparticles contained in the shape image by AFM are separated piece by piece through the watershed method.

Figure 11:
FIG. 11 shows an image upon the respective nanoparticles contained in the shape image according to AFM being separated from one another or into each particle through the watershed method regarding a sample for measuring particles according to the third embodiment of the present invention.

Based on the separated nanoparticles on the shape image illustrated in FIG. 11, the respective nanoparticles on the phase image illustrated in FIG. 10 are separated piece by piece. Then, with respect to the phase image, an analysis area is defined for each nanoparticle from the particulate boundary towards the particulate center with the exclusion of the particulate areas having the prescribed number of pixels. The RMS value of the phase image is calculated at such analysis area for each nanoparticle; such value is divided by the area of the analysis area; and the resulting value is defined as the phase roughness. The surface of the silver nanoparticle is larger in phase roughness than that of the PSL one, so that setting a threshold value of the phase roughness in an arbitrary manner permits the silver ones and the PSL ones to be discriminated from one another. The threshold value was defined as 3 herein for discriminating the nanoparticles.

Figure 12:
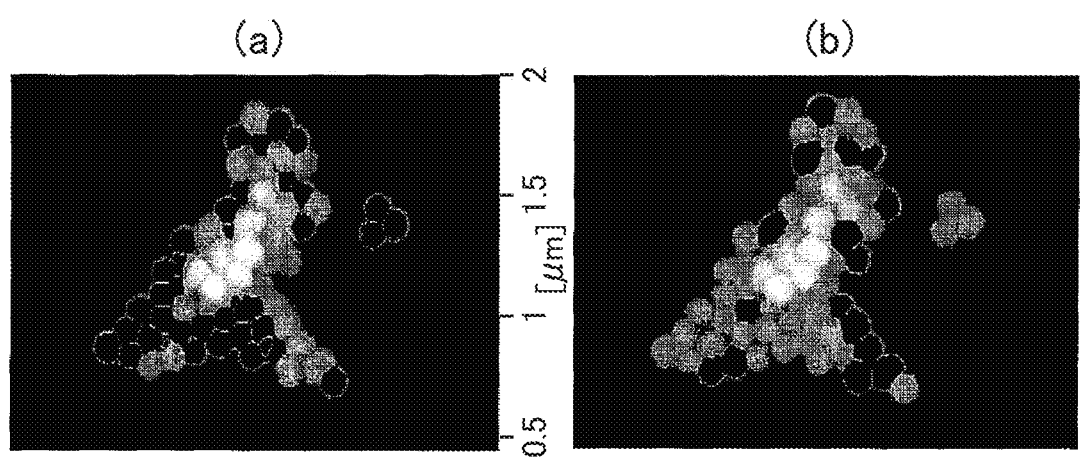
FIG. 12 shows images to explain an example in which the silver nanoparticles and PSL nanoparticles are discriminated from one another based on phase roughness regarding a sample for measuring particles according to the third embodiment of the present invention: (a) illustrating that the phase roughness is <3 while (b) illustrating that the phase roughness is >3.

FIG. 12 illustrates an example in which the silver nanoparticles and the PSL ones are discriminated from one another. With reference to the image of FIG. 12 (a), the colored (dark contrasted) nanoparticles indicate to those having the phase roughness <3, which correspond to the PSL ones. With reference to the image of FIG. 12 (b), the colored (dark contrasted) nanoparticles indicate those having the phase roughness >3, which correspond to the silver ones. The average particle size, the standard deviation of the particle sizes and the number of particles calculated for each of the discriminated particulate species were as follows: 91.8 nm, 6.0 nm and 39 respectively with the nanoparticles (PSL ones) shown in FIG. 12 (a) while 94.8 nm, 8.2 nm and 16 respectively with those (silver ones) shown in FIG. 12 (b). To note, the nanoparticles indicated in white in both FIGS. 12 (a) and 12 (b) are those of the second layer, so that the non-discriminated nanoparticles correspond to those of the first layer which are not analyzed due to being overlapped with the second layer.

Through the above operational steps, the silver nanoparticles and the PSL ones were discriminated from one another, as the result of which the average particle size, the standard deviation of the particle sizes and the number of particles for the respective particulate species were calculated. The above discrimination steps also apply to the other discrimination methods (viscosity method, friction force method, electrical conductivity method, magnetic force method) described in the second embodiment.

According to the embodiment, it allows a sample for measuring particles, a method for measuring particles and an apparatus for measuring particles which enable the three-dimensional particulate shape to be measured and the particulate species to be evaluated to be provided.

It should be noted that the present invention is not limited to the above embodiments, but can be modified into various manners. For example, the above embodiments are only intended for facilitating the persons skilled in the art to understand the present invention, so that the present invention is not necessarily limited to what embodies all the features presented herein. In addition, some of the features according to a certain embodiment may be replaced with those of the other embodiments or the features of the other embodiments may be added to those of a certain embodiment. Additionally, another feature may be added to a part of features according to each embodiment or a part of such features may be replaced with another feature by deletion.

INDUSTRIAL APPLICABILITY

The present invention is optimal for measuring the particle size and particle size distribution of powders in general, especially for measuring the particles having 1000 nm or smaller in particle size.

LIST OF REFERENCE SIGNS

101: substrate
102-A to 102-D: substrate areas decorated with surface decorations A to D
103: surface decoration separation band
104: substrate
111: substrate
112: surface decoration
113: solution
114-1, 114-2: liquid surface
115: nanoparticle
116: nanoparticles moving to the outer side of droplet
117, 119: ring-shaped precipitation of nanoparticles
118: surface decorated substrate after the droplet is dried
121: surface decorated substrate kit
122: sample container
123: lid
124: sloped platform
131: nanoparticles (silver)
132: stepped line chart
133: bar graph
141: measuring screen
142: measuring scanning line
143-1 to 143-7: standard nanoparticles isolated from one another in terms of particulate disposition (isolated standard ones)
144-1 to 144-7: nanoparticles to be measured isolated from one another in terms of particulate disposition (isolated nanoparticles to be measured)
145-1, 145-2: aggregated standard nanoparticles in terms of particulate disposition (clustered standard nanoparticles)
146-1: aggregated nanoparticles to be measured (clustered nanoparticles to be measured)
151: substrate
152: probe
153: probe tip end approximating to a sphere
154: locus of the probe according to the AFM measurement
155: nanoparticles.

The invention claimed is:

1. An apparatus for measuring particles comprising:
a scanning probe or a charged particle beam probe; and
a substrate on which isolated nanoparticles to be measured are disposed and isolated standard nanoparticles are disposed in a vicinity of the isolated nanoparticles to be measured,
wherein three-dimensional shapes of the isolated nanoparticles to be measured are rectified with measuring results of the isolated standard nanoparticles disposed in the vicinity of the isolated nanoparticles to be measured in use.

2. A method for measuring particles comprising:
a first step of preparing a substrate on which isolated nanoparticles to be measured are disposed and isolated standard nanoparticles are disposed in a vicinity of the isolated nanoparticles to be measured;
a second step of measuring the isolated nanoparticles to be measured and the isolated standard nanoparticles which are disposed on the substrate employing a scanning probe or a charged particle beam probe;
a third step of deriving a shape of the scanning probe or a beam profile of the charged particle beam probe from results of the isolated standard nanoparticles measured at the second step; and
a fourth step of rectifying three-dimensional shapes of the isolated nanoparticles to be measured employing the shape of the scanning probe or the beam profile of the charged particle beam probe.

3. The method for measuring particles according to claim 2, wherein the substrate is a surface decorated substrate in which the surface is decorated with a functional group having chemical or physical interaction with the surface.

4. The method for measuring particles according to claim 2,
wherein the second step further includes a step of simultaneously measuring information on particulate shapes and information on physical properties.

5. The method for measuring particles according to claim 4,
wherein the information on particulate shapes include height, aspect ratio, circularity, asperity or phase roughness while the information on physical properties includes viscosity, friction force, electric current or magnetic force.

6. The method for measuring particles according to claim 5,
wherein a discrimination step of discriminating the isolated standard nanoparticles from the isolated nanoparticles to be measured further intervenes between the second and third steps; and
the discrimination step includes a step of discriminating the isolated standard nanoparticles from the isolated nanoparticles to be measured employing the information on particulate shapes or the information on physical properties.

* * * * *